United States Patent [19]

Chao et al.

[11] Patent Number: 4,625,000

[45] Date of Patent: Nov. 25, 1986

[54] PROCESS FOR PREPARING SULFONATED POLY(ARYL ETHER) RESINS

[75] Inventors: Herbert S. Chao, Watervliet, N.Y.; Donald R. Kelsey, Hillsborough, N.J.

[73] Assignee: Union Carbide Corporation, Danbury, Conn.

[21] Appl. No.: 743,972

[22] Filed: Jun. 12, 1985

[51] Int. Cl.[4] .................... C08F 283/00; C08G 8/28
[52] U.S. Cl. .................................. 525/534; 525/471; 525/514; 525/521; 525/535
[58] Field of Search ............... 525/471, 514, 521, 534, 525/535

[56] References Cited

U.S. PATENT DOCUMENTS

| | | |
|---|---|---|
| 2,945,842 | 7/1960 | Eichhorn et al. |
| 3,055,929 | 6/1962 | Bozzetto. |
| 3,393,160 | 7/1968 | Corte et al. |
| 3,539,655 | 11/1970 | Strachan et al. ............... 525/534 |
| 3,539,656 | 11/1970 | Noshay et al. ............... 525/534 |
| 3,539,657 | 11/1970 | Noshay et al. ............... 525/534 |
| 3,709,841 | 1/1973 | Quentin et al. |
| 4,093,600 | 6/1978 | Fan et al. ............... 525/534 |
| 4,256,862 | 3/1981 | Binsack et al. ............... 525/534 |
| 4,413,106 | 11/1983 | Coplan et al. ............... 525/534 |
| 4,414,368 | 11/1983 | Coplan et al. ............... 525/534 |
| 4,419,486 | 12/1983 | Rose ............... 525/534 |
| 4,508,852 | 4/1985 | Bikson et al. ............... 525/534 |

OTHER PUBLICATIONS

Noshay et al., J. Appl. Polym. Sci., 20, 1885, 1976.
Johnson et al., J. Polym. Sci., Polym. Chem. Ed., 22, 721, 1984.
Schmidt et al., Chem. Ber., 95, 47-53, 1962.
Duffaut et al., Bull. Soc. Chim. Fr., 1963, 512-517.
Felix et al., Angew. Chem. Int. Ed. Engl., 18, 1979, 402-403.
Felix et al., Angew. Chem. Int. Ed., Engl., 16, 1977, 488-489.
Hofmann et al., Synthesis, Sep. 1979, 699-700.
Hofmann et al., Liebigs Ann. Chem., 1982, 282-297.
Grignon-Dubois et al., J. Organometal. Chem., 124, 1977, 135-142.

*Primary Examiner*—Lucille M. Phynes
*Attorney, Agent, or Firm*—Donald M. Papuga

[57] ABSTRACT

Poly(aryl ether) resins having repeat units of the structure

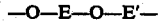

wherein E is the residuum of a dihydric phenol and E' is the residuum of a benzenoid compound having an inert electron withdrawing group in at least one of the positions ortho and para to the valence bonds, can be sulfonated by first reacting with a silyl halosulfonate, or the combination of a silyl halide and a halosulfonic acid, to form a resin having pendant silyl sulfonate groups, followed by the base cleavage of the silyl moiety to form the sulfonated resin. The sulfonated resins may be used to make membranes.

67 Claims, No Drawings

PROCESS FOR PREPARING SULFONATED POLY(ARYL ETHER) RESINS

FIELD OF THE INVENTION

This invention relates to a novel process for sulfonating poly(aryl ether) resins, and in particular to using a silyl halosulfonate or a combination of a halosulfonic acid and a silyl halide as the sulfonating agent. The invention further relates to sulfonated poly(aryl ether) resins and to membranes fabricated therefrom.

BACKGROUND

Poly(aryl ether) resins are a class of resins having a variety of uses in forming wire coatings, wire insulation, and electrical connectors. When sulfonated, these resins can be used to form osmosis and reverse osmosis membranes useful in processes to purify a wide variety of liquids, for example in desalination processes to purify saline solutions such as seawater. A representative poly(aryl ether) resin is a polysulfone having the repeat unit structure:

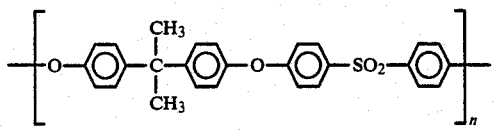

n can range from 2 to 200 but is more typically 50 to 100. The above polysulfone is herein sometimes referred to as PSF.

PSF has been sulfonated by a variety of methods. For example, an early method disclosed in U.S. Pat. No. 3,709,841 to Quentin discloses sulfonation using chlorosulfonic acid:

$$PSF + ClSO_3H \rightarrow PSF-SO_3H + HCl \qquad (I)$$

This method may induce chain cleavage, branching, or cross-linking, however (Johnson et al, *J. Polym. Sci., Polym. Chem. Ed.*, 22, 721, 1984). The reaction is also heterogeneous, which can affect reproductibility and the extent of sulfonation.

Noshay and Robeson (*J. Appl. Polym. Sci.*, 20, 1885, 1976) reported a milder sulfonation process using a complex of $SO_3$ with triethylphosphate, $SO_3\cdot PO(OCH_2CH_3)_3$, which may minimize side reactions. This process is cumbersome, however, due to the reactivity and toxicity of $SO_3$ and the exothermic reaction of $SO_3$ with triethylphosphate.

The sulfonated polysulfone is often converted to the salt form for use in membranes by reaction with a base such as sodium hydroxide:

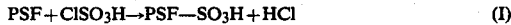

Salts of sulfonated polysulfone are disclosed, for example, in U.S. Pat. No. 3,875,096 to Graefe et al. and in Johnson et al. and Noshay et al., supra.

Several articles have appeared which report the sulfonation of various organic compounds using trimethylsilyl chlorosulfonate as a sulfonating agent. See Hofmann et al., Synthesis, Sept., 1979, 699–700; Hofmann et al, Liebigs Ann. Chem., 1982, 282–297; Grignon-Dubois et al., J. Organometal. Chem., 124, 1977, 135–142; Duffaut et al., Bull. Soc, Chim. Fr., 1963, 512–517; Felix et al, Angew. Chem. Int. Ed. Engl., 18, 1979, 402–403; and Felix et al, Angew. Chem. Int. Ed. Engl., 16, 1977, 488–489. None of these articles discloses the sulfonation of any polymer, however. Nor do any of these articles suggest using a combination of a silyl halide and a halosulfonic acid in any sulfonation procedure.

SUMMARY OF THE INVENTION

This invention provides in one aspect novel processes of sulfonating poly(aryl ether) resins generally by (i) in a first step, making an intermediate resin product by reacting a poly(aryl ether) resin with a silyl halosulfonate or with the combination of a silyl halide and a halosulfonic acid, thereby forming a poly(aryl ether) resin having a portion of repeat units in the resin backbone derivatized with pendant silyl sulfonate groups, followed by (ii) reacting the intermediate resin product thus formed with a base to cleave silyl moieties from the silyl sulfonate groups, thereby forming a sulfonate salt of said poly(aryl ether) resin.

In another aspect the invention provides novel intermediate resins per se, that is poly(aryl ether) resins having a portion of repeat units in the resin backbone derivatized with pendant silyl sulfonate groups extending from aromatic ring portions of the units:

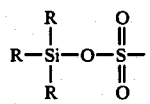

where R is defined below.

The intermediate resins can be formed by reacting a poly(aryl ether) resin with a silyl halosulfonate having the formula

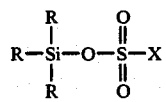

wherein X is Cl, Br or I, preferably Cl, and the R groups, which can be the same or different, are inert organic radicals.

The intermediate resins can also be formed by reacting the resin with a combination of a halosulfonic acid

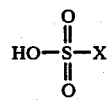

and a silyl halide having the structure

wherein X and R are as defined above. Using this combination to make the intermediate resin is sometimes referred to herein as "in situ" sulfonation, in contrast to sulfonation employing a preformed silyl halosulfonate.

The terms "combination" and/or "silyl halide/halosulfonic acid combination" are intended to denote that a silyl halide and a halosulfonic acid are used together, being provided to a solution of a poly(aryl ether) resin as a mixture or as separate components.

The product formed from the reaction of a poly(aryl ether) resin with a silyl halosulfonate or with a silyl halide/halosulfonic acid combination is herein referred to as an intermediate or derivative, and is a poly(aryl ether) resin having pendant silyl sulfonate groups, $R_3$—SiO—$SO_2$—, along the resin backbone. Base (e.g., sodium hydroxide in the following illustration) may then be added to cleave the silyl moiety, yielding the poly(aryl ether) resin in (sulfonate) salt form, i.e., a resin having —$SO_3^-M^+$ groups wherein $M^+$ is a cation derived from the base as hereinafter further disclosed and described.

As a specific example, the following equations A and B describe a procedure for sulfonating according to this invention in flow chart form for a single repeat unit of PSF using trimethylsilyl chlorosulfonate as the sulfonating agent, wherein Me denotes a methyl group.

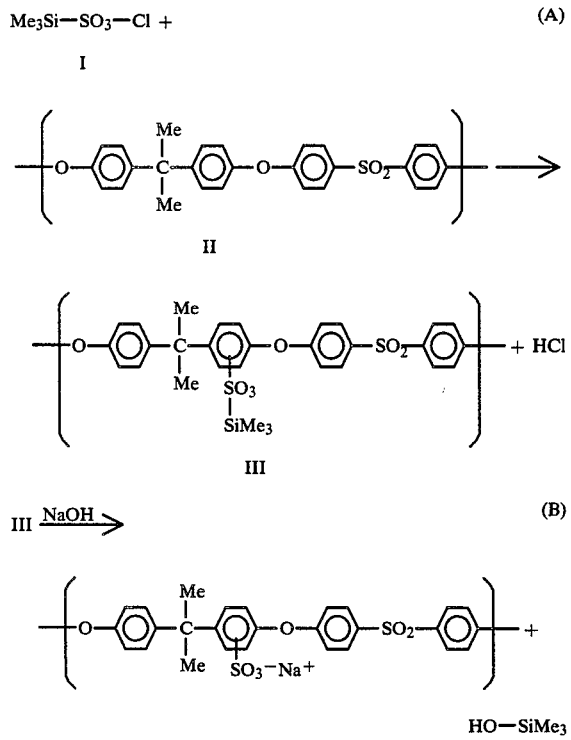

The same result as above can be achieved if, instead of using trimethylsilyl chlorosulfonate (i.e. a silyl sulfonate), trimethylsilyl chloride combined with chlorosulfonic acid (i.e. a silyl halide/halosulfonic acid combination) is used.

Thus the sulfonated poly(aryl ether) resins and intermediate resins provided by this invention can be produced in situ using a silyl/halide halosulfonic acid combination as the sulfonating agent. The resins can also be formed using a silyl halosulfonate as the sulfonating agent, which in turn can be preformed as the reaction product of a silyl halide/halosulfonic acid combination. The sulfonating agents useful in this invention thus form a family of functionally equivalent reactants.

The present invention avoids a number of problems associated with previously known sulfonation methods. For example, the present sulfonating agents generally result in a homogeneous reaction system, as opposed to the heterogeneous system which results from using a halosulfonic acid. When a halosulfonic acid such as chlorosulfonic acid is dissolved in a solution of a poly(aryl ether) resin such as PSF, a single phase reaction solution is initially obtained. As the reaction proceeds, however, two phases develop, one of which is a thick, relatively viscous phase rich in sulfonated polymer. This thick phase is difficult to stir effectively and presents other processing problems including difficult filtration.

By contrast, when a silyl halosulfonate or a silyl halide/halosulfonic acid combination is dissolved in a solution of polymer the homogeneous solution initially obtained remains as a homogeneous single phase throughout the course of the reaction which produces a silyl sulfonate polymer intermediate. Addition of a base to cleave the silyl moiety does not destroy the single phase, homogeneous nature of the reaction medium, although turbidity may be observed. Stirring and filtration are relatively facile. It is further believed that the better mixing achieveable in a homogeneous reaction system allows for more uniform distribution of sulfonation, along the backbone of the polymer, and thus for a more uniform sulfonated polymer product, as opposed to less uniform sulfonation which may result due to the greater difficulty of mixing in a heterogeneous system. The homogeneity is believed to be due to the silyl moiety which serves as a solubilizing group and allows the silyl halosulfonate polymer derivative to dissolve in the solvent used to dissolve the unsulfonated polymer.

Importantly, the present sulfonating agents generally result in less chain scission than that which results when using a halosulfonic acid alone. Thus, in another aspect this invention advantageously provides higher molecular weight sulfonated polymers relative to those obtained by employing chlorosulfonic acid under identical reaction conditions. High molecular weight is an important feature needed to make membranes having good mechanical strength for resistance to tearing and rupturing.

The ability of a silyl halide/halosulfonic acid combination to produce sulfonated poly(aryl ether) resins having a higher molecular weight than those produced using chlorosulfonic acid alone is particularly surprising. The reaction of a poly(aryl ether) resin with a halosulfonic acid alone produces one equivalent of hydrogen halide, as exemplified by reaction (I), supra. The reaction of a poly(aryl ether) resin with a silyl halide/halosulfonic acid combination, by contrast, produces two equivalents of hydrogen halide as follows

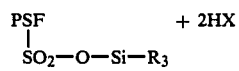

yet higher polymer molecular weights are obtained than those obtained by using a halosulfonic acid. It was unexpected that higher molecular weights could be obtained for a sulfonated resin in a reaction medium where double the amount of hydrogen halide is produced, and hence where greater acid cleavage of the resin would be expected to occur.

Also, the toxicity and exothermicity problems encountered from using the $SO_3$.phosphate process described above can be avoided when using the processes of this invention.

The invention shall be further described and exemplified in the following detailed discussion.

DETAILED DISCUSSION

A. Polyarylether Resins

The poly(aryl ether) resins suitable for use in this invention are linear, thermoplastic polyarylene polyethers containing recurring units of the following formula:

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in, for example, U.S. Pat. Nos. 3,264,536 and 4,175,175. It is preferred that the dihydric phenol be a dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxphenyl)2-phenyl ethane, or bis(4-hydroxyphenyl)methane. Because the sulfonation reaction is electrophilic, at least one of the rings in the dihydric dinuclear phenol is preferably "undeactivated", meaning that it is not substituted by deactivating, electron withdrawing groups. The remaining ring may contain deactivating groups. Other materials also termed appropriately bisphenols are also highly valuable and preferred. These materials are the bisphenols of a symmetrical or unsymmetrical joining group, as, for example, ether oxygen (—O—), or hydrocarbon residua in which the two phenolic nuclei are joined to the same or different carbon atoms of the residue.

Such dinuclear phenols can be characterized as having the structure:

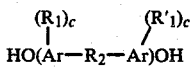

wherein Ar is an aromatic group and preferably is a phenylene group, $R_1$ and $R'_1$ can be the same or different inert substituent groups such as alkyl groups having from 1 to 4 carbon atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_2$ is representative of a bond between aromatic carbon atoms as in dihydroxy-diphenyl, or is a divalent radical, including for example, radicals such as —O—, —S—, —S—S—, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others:

the bis-(hydroxyphenyl)alkanes such as
2,2-bis-(4-hydroxyphenyl)propane,
2,2-bis(4-hydroxy-3,5 dimethylphenyl)propane
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane,
and the like;
di(hydroxyphenyl)ethers, such as bis-(4-hydroxyphenyl)ether,
4,2'-, 2,2'-, and 2,3'-dihydroxyphenyl ether,
4,3'- and 4,4'-dihydroxyl-2,6-dimethyldiphenylether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxyl-3,6-dimethoxydiphenyl ether.

Also preferred as useful dihydric phenols are the following:

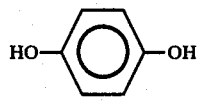

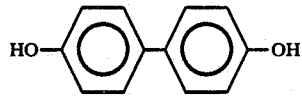

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed to form an E' benzenoid residuum in this invention, which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used.

It is preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

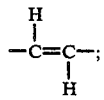

the sulfoxide group

the azo group —N=N—; the saturated fluorocarbon groups

—CF$_2$—CF$_2$CF$_2$—; organic phosphine oxides

where R$_3$ is a hydrocarbon group, and the ethylidene group

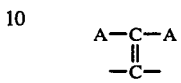

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

Examples of benzenoid compounds which are useful in contributing E' residua to a poly(aryl ether) resin are the following:
4,4'-dichlorodiphenyl sulfone,
4,4'-difluorodiphenyl sulfone,
4,4'-bis(4-chlorophenylsulfonyl)biphenyl,
4,4'-bis(4-fluorophenylsulfonyl)biphenyl,
4,4'-difluorobenzophenone,
4,4'-dichlorobenzophenone,
4,4'-bis(4-fluorobenzoyl)benzene
4,4'-bis(4-chlorobenzoyl)benzene,
2,6-dichlorobenzonitrile,
isomers thereof, and the like.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polyethers may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the polyethers may be prepared by the procedure described in Canadian Pat. No. 847,963 wherein the bisphenol and dihalobenzenoid compound are heated in the presence of potassium carbonate using a high boiling solvent such as diphenylsulfone or sulfolane.

Preferred polyarylene polyethers of this invention are those prepared using the dihydric polynuclear phenols of the following types, including the derivatives thereof which are substituted with inert substituent groups

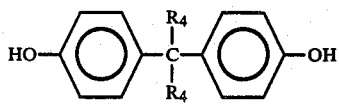 (a)

in which the R₄ groups represent independently hydrogen, lower alkyl, aryl and the halogen substituted groups thereof, which can be the same or different;

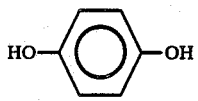 (b)

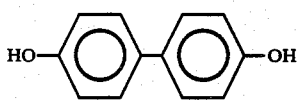 (c)

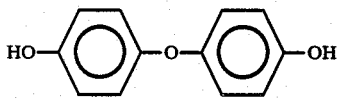 (d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residue. If mixtures of polynuclear dihydric phenols such as binary mixtures of dinuclear bisphenols are employed, each ring in one of the component dihydric phenols may be deactivated if desired, allowing for the incorporation of (difficultly sulfonatable) deactivated units into the polymer backbone. Representative of such deactivated dihydric polynuclear phenols are those wherein the rings are connected by electron withdrawing groups, including dihydric phenols such as

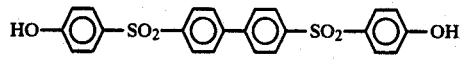

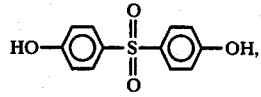

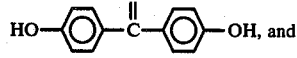

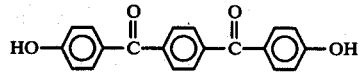

If such phenols having each ring deactivated are employed it is preferred that they be limited to less than about 95 mole percent of the —E— units comprising the copolymer backbone.

The poly(aryl ethers) have a reduced viscosity of from about 0.2 to about 2, preferably from about 0.35 to about 1.5 as measured in an appropriate solvent at an appropriate temperature depending on the particular polyether, such as in methylene chloride at 25° C.

The preferred poly(aryl ethers) have one or more repeat units or subunits of the formula:

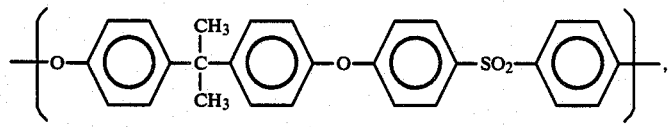

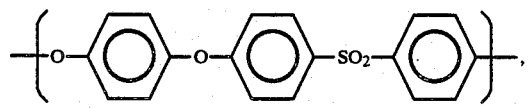

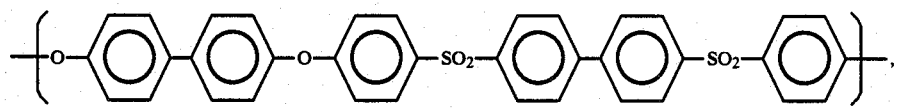

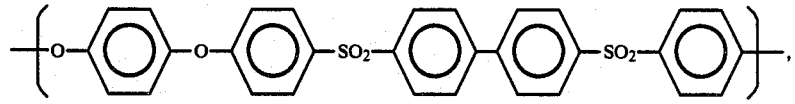

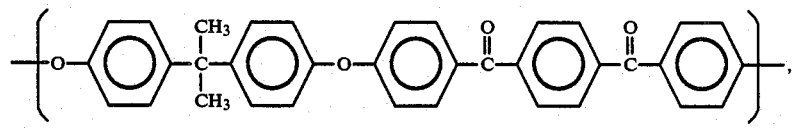

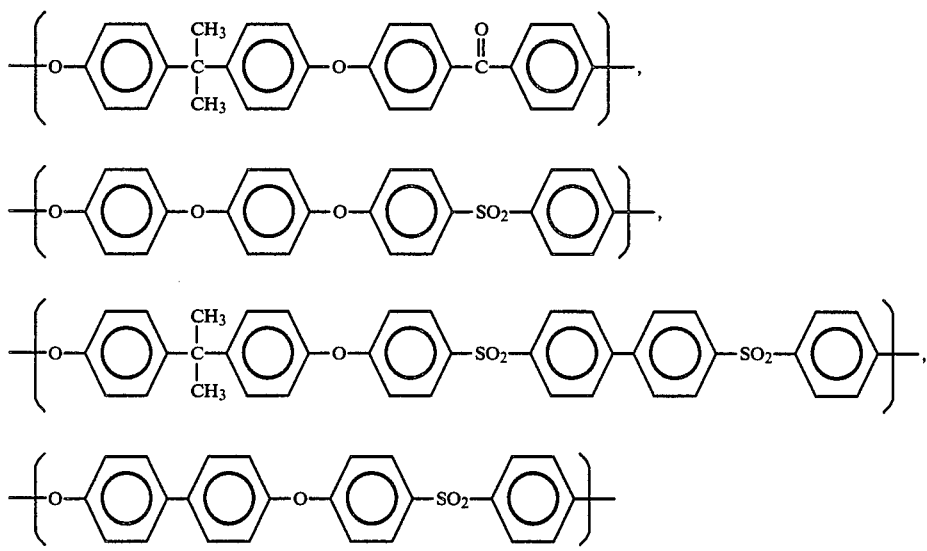

The term "subunit" means that any of the above, in addition to serving as an entire repeat unit, can also be contained as part of a larger repeat unit.

Polymers having repeat units or subunits as illustrated above are disclosed, for example, in U.S. Pat. No. 4,175,175; 4,320,224; 4,108,837; 4,009,149; 3,455,866; 3,518,067; 3,764,583; 3,400,065; 3,647,751; European patent (EP) application No. 81107193.5, published Mar. 24, 1982 under the publication No. 0047999; and EP application 80201194.0, published June 3, 1981 under the publication number 0029633.

For ease of discussion PSF is sometimes specifically referred to herein for purposes of exemplifying the invention. Such exemplification is not to be taken as limiting, however.

B. Process Conditions

The sulfonation reaction is conducted in a suitable solvent, suitability being determined by the ability of the solvent to dissolve the polymer and the sulfonating agent and by its inertness to the sulfonating agent. Preferred are chloroaliphatic hydrocarbons such as chloroform, methylene chloride, and 1,2-dichloroethane. Chlorinated aromatic hydrocarbons such as chlorobenzene are less desirable since, although they can be acceptable to dissolve the polymer, they can also be reactive to the sulfonating agent. It is believed that deactivated aromatic hydrocarbons such as trichlorobenzene and nitrobenzene are suitable solvents.

The amount of solvent used to conduct the reaction is non-critical although an amount of solvent should not be used that is large enough to dilute the reaction mixture to the point that the rate of reaction is adversely slowed. The minimum amount of solvent is that amount which is sufficient to just dissolve the polymer and the sulfonating agent. When using chloroaliphatic hydrocarbons such as methylene chloride or 1,2-dichloroethane, an amount of solvent between 5 and 20 ml per gram of polymer, preferably between 10 and 15 ml per gram of polymer, may be employed.

The reaction is preferably conducted at about room temperature, say between about 0° C. and about 35° C. Conducting the reaction at higher temperatures may increase chain scission to unacceptable levels relative to the amount of chain scission which occurs at lower temperatures. The reaction may be conducted at temperatures lower than 0° C. although the reaction rate may decrease, necessitating conducting the reaction for longer periods.

No special pressure considerations are required, the reaction generally being conducted at ambient pressure.

When making a sulfonated poly(aryl ether) resin using a silyl halide/halosulfonic acid combination, the halosulfonic acid can be any of the compounds having the formula $$\text{HO}-\overset{\overset{\displaystyle O}{\|}}{\underset{\underset{\displaystyle O}{\|}}{S}}-X$$

wherein X is Cl, or Br or I, preferably Cl.

As previously noted the silyl halide can be any compound having the structure $$\text{R}-\overset{\overset{\displaystyle R}{|}}{\underset{\underset{\displaystyle R}{|}}{Si}}-X$$

wherein X is halogen selected from the group consisting of Cl, Br and I, preferably Cl. The R groups can in general be the same or different organic radicals and be any group which is inert, i.e. which is not reactive toward the polymer, which does not render the sulfonating agent insoluble in the reaction medium, and which preferably does not interfere with base cleavage of the Si—O bond. R can, for example, be:

aliphatic or cycloaliphatic alkyl or alkoxy having 1–10 carbon atoms, including methyl, ethyl, propyl, isopropyl, butyl, isobutyl, cyclohexyl, and the alkoxy analogs thereof (e.g. methoxy, ethoxy etc.);

fluorinated alkyl and cycloalkyl, cyanoalkyl and cycloalkyl, and the like;

aryl having 6 to 18 carbon atoms such as phenyl or naphthyl wherein said aryl group may optionally be substituted by one or more electron withdrawing (i.e.

deactivating) groups such as halogen (F, Cl, Br or I), —NO$_2$, —CN, or —COR$^5$(R$^5$=C$_{1-10}$ alkyl);

Other suitable organic radicals include (siloxy or) oligosiloxy groups of the formula

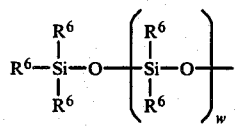

where w is 0 to about 10 and the R$^6$ groups can be the same or different and have the same meaning as for R above.

Representative silyl halides include the following:
chlorotrimethylsilane
chlorotriethoxysilane
chlorotriethylsilane
chloroethoxydimethylsilane
chlorotripropylsilane
chloromethoxydimethylsilane
chlorotrimethoxysilane
tributylchlorosilane
chlorodiethoxymethylsilane
butylchlorodimethylsilane
chloropentamethyldisiloxane
chlorotriisopropylsilane
chloroisopropyldimethylsilane
chloromethylbis(3,3,3-trifluoropropyl)silane
tri-tert-butylchlorosilane
chlorotriisopropoxysilane
dimethyldecylchlorosilane
4-(chlorodimethylsilyl)butyronitrile
tributoxychlorosilane
2-(chlorodimethylsilyl)propionitrile
chlorotrihexylsilane
chlorodimethyl(m-nitrophenethyl)silane
chlorodimethyl(2,3,4,5,6-pentafluorophenethyl)silane
chlorodimethyl[2,4,6-tris(1,1-dimethylethyl)phenoxy]-
    silane
chlorodimethyl(2-nitropropoxy)silane
chloro(isooctyloxy)dimethylsilane The amount of halosulfonic acid employed can in general vary from about 0.005 to about 2 moles per mole of polymer repeat units. The amount of silyl halide employed can vary from about 0.50 to about 2 moles per mole of halosulfonic acid, preferably between about 0.9 and about 1.4 moles. In a preferred embodiment molar equivalents of silyl halosulfonate and halosulfonic acid are provided to the reaction medium. The molar ratio of sulfonating agent to polymer repeat units or subunits can be adjusted to achieve a desired degree of sulfonation. For purposes of definition, "degree of sulfonation" is the number of individual polymer repeat units —O—E—O—E'— which have been sulfonated as a percentage of the total number of polymer repeat units available in the reaction mixture solution containing the reacting polymer. For example, a degree of sulfonation of about 33% indicates that about 1 out of every 3 polymer repeat units has been sulfonated.

When making a sulfonated poly(aryl ether) resin using a silyl halosulfonate, i.e. the reaction product of a silyl halide and a halosulfonic acid, the silyl halosulfonate can be any compound having the structure

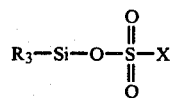

wherein X and R are as defined above.

As indicated, the above silyl halosulfonates may be synthesized by reacting the corresponding halosulfonic acid

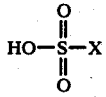

with a silyl chloride

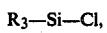

all symbols having the meanings previously assigned, following the general principles disclosed, for example, by Schmidt et al., Chem. Ber., 95, 47, (1962). Representative silyl chlorides are the same as those enumerated supra, and the like.

The amount of silyl halosulfonates reacted with a poly(aryl ether) resin can range from about 0.005 to about 2 moles of silyl halosulfonate per mole of polymer repeat units —O—E—O—E'— depending on the degree of sulfonation desired.

For a given reaction time, temperature, and concentration of polymer repeat units, increasing the concentration of sulfonating agent generally increases the degree of sulfonation. The number of moles of silyl halosulfonate used per mole of polymer repeat units —O—E—O—E'— can be increased beyond 2, but little advantage is to be gained.

Reaction times can vary widely from fractions of an hour to as long as desired and can be increased to increase the degree of sulfonation although, reaction conditions otherwise remaining constant, the rate of sulfonation may not increase linearly with reaction time.

The sulfonating agent may be added directly to the reaction mixture or it may first be dissolved in a solvent, preferably the solvent used to dissolve the polymer. Because the substitution reaction generates hydrogen halide, it is preferred to add the sulfonating agent dropwise to the dissolved polymer, although the time for addition may vary widely from minutes to several hours or more.

The reaction may be conducted by dissolving polymer, e.g., as a powder, fluff, or pellet in a solvent and charging the polymer solution and sulfonating agent to a suitable reaction vessel which is non-corrosive to HCl. Advantageously, the vessel may be glass or glass-lined or fabricated of a non-corrosive metal such as HASTELLOY (registered trademark of the Cabot Corporation). The vessel should also be provided with a means to effect mechanical mixing or stirring. Although the reaction has not been found to be particularly exothermic or endothermic, heating and/or cooling means may be desirable. It can also be desirable to provide means for providing an inert atmosphere such as nitrogen or argon over the reaction solution. Dry gas should be employed since excessive water or water vapor can interfere with the sulfonation.

Because HCl is generated in situ by the reaction, provision for scrubbing or trapping HCl from the reaction solution may also be employed. To remove HCl the means used to supply an inert gas atmosphere can be implemented to pass a gentle flow of gas over the surface of the reaction solution or to sparge gas through the solution followed by scrubbing or trapping HCl from the gaseous effluent, e.g. by passing the effluent through a solution of base.

In cases where a relatively volatile solvent such as methylene chloride is used to conduct the reaction a condenser provided with a coolant such as dry ice/acetone or chilled brine may be used to recondense solvent vapors and return them to the reaction medium.

After having conducted the reaction for the desired period, an intermediate solution is obtained containing the intermediate product, a polymer having silyl sulfonate groups, for example in the case of PSF specifically previously illustrated:

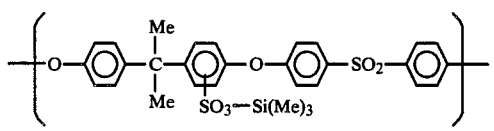

wherein all symbols are as previously defined. If desired, the silyl sulfonate derivative may be isolated, for example, by coagulation of the polymer in a nonsolvent such as methanol, acetone, or water.

Cleavage of the silyl group may be conducted by adding base, yielding the desired sulfonated polymer product. A solution of base in an appropriate solvent is added to the reaction solution and mechanical agitation continued for a time sufficient to substantially complete the cleavage. Upon addition of the base some turbidity may be observed initially if the solvent in which the base is dissolved is one capable of coagulating the polymer, although generally no precipitation occurs.

The base used to cleave the trimethylsilyl group can be any suitable organic or inorganic base such as ammonium hydroxide or an alkali or alkaline earth metal hydroxide or alkoxide having 1-15 carbon atoms, preferably 1-3 carbon atoms, including sodium, lithium and potassium hydroxide, sodium, lithium and potassium methoxide, sodium, lithium and potassium ethoxide and the corresponding magnesium, calcium, and barium hydroxides and alkoxides, dissolved in a suitable solvent such as an alcohol. Bases such as alkali metal amides eg. $KNH_2$, $NaNH_2$ or $LiNH_2$ can also be employed, or the alkyl analogs such as $NaNHR$ or $NaNR_2$ where R is a $C_{1-15}$ alkyl group. Inorganic hydride bases such as lithium, sodium, or potassium hydride or calcium hydride may also be used. Alkali metal hydroxides and alkoxides are preferred.

The base should be added preferably in an amount sufficient to cleave pendant silyl groups and to neutralize any acid still present in solution. An excess of base may be used, although any excess should be minimized to avoid undue base cleavage of the resin chain backbone. The base cleavage of the silyl group is conducted preferably with continuous mechanical stirring for a time sufficient for the cleavage reaction to reach substantial completion. Depending on base concentration, polymer concentration, etc. generally the base cleavage is substantially complete within about an hour although the cleavage reaction may be continued for longer if desired with care to avoid chain cleavage of the resin.

Advantageously, the cleavage reaction yields the sulfonated polymer in salt form

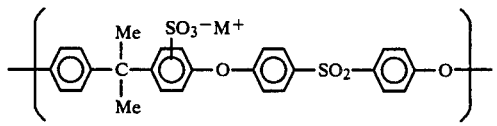

where $M^+$ is a cation (e.g. $NH_4^+$, $Na^+$, $Li^+$, $K^+$, $Mg^{2+}$ $Ca^{2+}$ or $Ba^{2+}$) derived from the base which cleaves the silyl moiety. The polymer salt can be fabricated into a more useful asymmetric membrane and a membrane of superior desalination properties than membranes prepared from the acid form of the polymer, as disclosed in U.S. Pat. No. 3,875,096. The salt form is more stable than the acid form, especially at high temperatures, and prevents any self degradation which might otherwise occur due to the presence of acidic sulfonic acid groups.

If it is desired, however, to fabricate membranes from the sulfonic acid ($-SO_3H$) form of a sulfonated poly(aryl ether) resin, or to obtain the acid form for any other application, the resin sulfonate salt can easily be converted to the resin sulfonic acid by simply exposing the salt to a dilute solution of acid. Suitable acids are, for example, carboxylic acids such as acetic acid, propionic acid, and halogenated analogs thereof (e.g., trichloracetic acid and trifluoroacetic acid), sulfonic acids such as p-toluenesulfonic acid, methanesulfonic acid, and halogenated analogs thereof (e.g., trifluoromethanesulfonic acid, trichloromethanesulfonic acid), and mineral acids such as hydrochloric, sulfuric, and nitric acids. The preceding are representative and by no means exhaustive.

The salt can be converted to the acid following base cleavage of silyl groups and prior to coagulation by adding acid in a suitable solvent which is miscible with the solvent in which the resin salt is dissolved. Care should be taken to add acid sufficient no only to convert the salt but also to neutralize any base left over following the base cleavage of silyl groups. The resin should be washed following coagulation to remove any residual free acid.

Alternatively, the resin salt can first be coagulated as known in the art by adding an excess of a nonsolvent (e.g. water, acetone, or an alcohol) to the resin salt solution obtained after base cleavage and isolated as by filtration. The resin so isolated may then either be washed directly with a nonsolvent (e.g. water) acid solution or soaked therein. Conversion to the acid, by percolating acid through a sulfonated poly(aryl ether) resin salt obtained as a filtrate, is feasible because the filtrate is generally a fluffy porous product which allows efficient surface contact with the acid nonsolvent solution, in the manner one regenerates an ion exchange resin. Soaking is preferred, however.

Alternatively, the resin salt can be coagulated, isolated as by filtration, and then redissolved in fresh chloroaliphatic hydrocarbon solvent. Acid may be dissolved in the solution to convert the salt.

The quantity and concentration of acid which should be added to a resin salt solution or used to wash or soak a coagulated resin salt is not critical but may depend, to some extent, on the degree of sulfonation. Generally, a mole ratio of acid to sulfonate salt groups of about 10:1 is entirely sufficient to convert substantially all of the sulfonate salt groups to the acid form. Adding acid to a resin salt solution sufficient to make the solution 1N (one normal), or less, in acid, or soaking or washing coagulated polymer with 1N (or less) concentrations of acid will generally be sufficient to effect conversion, regardless of the degree of sulfonation. Acid solutions more concentrated than 1N may be used although care should be taken to avoid acid cleavage of the resin, uncontrolled sulfonation when using high concentrations of sulfuric acid, or undue oxidative degradation when using high concentrations of nitric acid.

As noted above, coagulation of the sulfonated resin in either acid or salt form, if desired, may be effected by adding a solution of the resin, in an amount sufficient to effect coagulation, any liquid which is miscible therewith but which is not a solvent for the sulfonated resin, as known in the art.

Membranes can be fabricated from sulfonated poly(aryl ether) resins produced in accordance with this invention, as well known in the art, say by casting a solution of resin onto a suitably shaped surface or substrate and evaporating the solvent. Suitable solvents are, in general, polar organic solvents such as dimethylformamide, dimethylsulfoxide, methylpyrrolidone, and diethylene glycol monoethyl ether, with dimethylformamide being preferred. Reinforced membranes may be obtained by casting onto a screen such as a woven fabric or grid. Such methods have been disclosed and exemplified, for instance, in U.S. Pat. Nos. 3,709,841 and 3,875,096.

The invention will be further explained and described by means of the following examples which are not to be taken as limiting:

C. Experimental

Example 1

Forty grams of P-1700, the designation for a commercial polysulfone manufactured by Union Carbide Corporation, was dissolved in 300 ml of methylene chloride ($CH_2Cl_2$). The solution was placed into a glass four neck flask provided with a mechanical stirrer, thermometer, reflux condenser, and nitrogen inlet. Circulation of nitrogen over the surface of the solution was started and maintained throughout the experiment. A separate solution of 11.95 gms (0.0634 mole) of trimethylsilyl chlorosulfonate in 100 ml of methylene chloride was prepared and added dropwise over a period of 10 minutes to the stirred polymer solution at room temperature. Stirring was continued overnight (~20 hrs.). Twenty-five grams of a 25% by weight solution of sodium methoxide in methanol were added. Development of slight turbidity was observed. However, no precipitation of polymer was observed. After 1 additional hour of stirring the reaction mixture was coagulated in an excess (5:1 by vol.) of methanol. The white fluffy precipitate was filtered and washed once with water and once with methanol. Each wash consisted in a 5 minute agitation in a Waring blender with 2 liters of water or methanol.

The reduced viscosities were:

0.37 dl/gms, (25° C. 0.2 gms/100 ml. in N-methylpyrrolidone) for the starting material, P-1700; and 1.12 dl/gm for the final sulfonated salt. A sulfur analysis indicated that the material contained 0.3083 $SO_3Na$ units per repeat unit of the polymer, i.e. a degree of sulfonation of about 31%.

In comparison to the above result the effect of shorter reaction time (i.e. the stirring period prior to the addition of the sodium methoxide/methanol solution) is shown in the tabulation of reduced viscosity (RV) and degree of sulfonation that follows:

| Time (Hrs.) | RV[1] | Degree of Sulfonation %[2] |
|---|---|---|
| 4 | 0.98 | 14.54 |
| 5 | 1.03 | 13.78 |

[1]0.2 gms/100 ml; 25° C., N—methylpyrrolidone (NMP).
[2]The two results are considered essentially identical, the discrepancy being due to experimental errors inherent in the analysis.

Example 2

The general procedure of example 1 using P-1700 was followed except that only 8.54 gms (0.0453 moles) of $(CH_3)_3SiSO_3Cl$ were employed. Also, the reaction was performed at reflux (~40° C.) for 4 hours only. The polymer was isolated as in example 1. The sulfonated product had an RV of 1.15 (0.2 gm/100 ml, 25° C., NMP and its degree of sulfonation was 32.2%.

The result indicates that at higher temperatures less of the expensive silyl reagent and shorter reaction times are required to achieve a comparable degree of sulfonation. However, if the reaction is continued at reflux overnight (~20 hrs.) degradation of the polymer is observed; the degraded material is more highly sulfonated. Thus, the degraded product had an RV of 0.58 and the degree of sulfonation was 40.7%.

Examples 3–21

Additional data and results following the general procedure of Example 1 and using reaction times, temperatures and amounts of starting materials as noted are presented in Table I.

TABLE 1

| | SULFONATION OF UCC P-1700 BY $(CH_3)_3SiSO_3Cl$[1] | | | | | | |
|---|---|---|---|---|---|---|---|
| | P-1700 | Conc. of ClSO$_3$—Si(CH$_3$)$_3$ | Reaction | | Polymer | | |
| Exp. No. | (mole repeat unit/liter) | (mole/mole repeat unit) | Time (hrs.) | Temp. (°C.)[2] | RV[3] | Degree of Sulfonation (%) | T$_g$ |
| 3. | 0.11 | 0.10 | 3 | 25 | 0.35 | 7.57 | 185 |
| 4. | 0.11 | 0.10 | 24 | 25 | 0.55 | 9.44 | 184 |
| 5. | 0.11 | 0.30 | 3 | 25 | 0.45 | 10.9 | — |
| 6. | 0.11 | 0.40 | 3 | 25 | 0.78 | 9.64 | 191 |
| 7. | 0.11 | 0.40 | 24 | 25 | 0.92 | 18.15 | — |
| 8. | 0.11 | 0.40 | 24 | 80[4] | 0.81 | 28.76 | 204 |
| 9. | 0.11 | 0.50 | 3 | 25 | 0.72 | 12.47 | 190 |
| 10. | 0.11 | 0.50 | 24 | 25 | 0.83 | 22.8 | 211 |
| 11. | 0.11 | 0.60 | 3 | 25 | 0.83 | 19.6 | 196 |
| 12. | 0.11 | 0.60 | 24 | 25 | 1.21 | 23.8 | 215 |
| 13. | 0.11 | 0.80 | 3 | 25 | 0.93 | 24.4 | 200 |
| 14. | 0.11 | 0.90 | 3 | 25 | 1.00 | 21.4 | 204 |

TABLE 1-continued
SULFONATION OF UCC P-1700 BY (CH$_3$)$_3$SiSO$_3$Cl[1]

| Exp. No. | P-1700 (mole repeat unit/liter) | Conc. of ClSO$_3$—Si(CH$_3$)$_3$ (mole/mole repeat unit) | Reaction Time (hrs.) | Reaction Temp. (°C.)[2] | Polymer RV[3] | Polymer Degree of Sulfonation (%) | T$_g$ |
|---|---|---|---|---|---|---|---|
| 15. | 0.22 | 0.40 | 2.5 | 40 | 0.96 | 25.94 | — |
| 16. | 0.22 | 0.40 | 20 | 40 | 0.35[5] | 33.31 | — |
| 17. | 0.22 | 0.60 | 24 | 25 | 1.17 | 22.34 | — |
| 18. | 0.22 | 0.70 | 22 | 25 | 1.16 | 37.90 | 230 |
| 19. | 0.22 | 0.80 | 1 | 25 | 0.72 | 9.8 | 191 |
| 20. | 0.22 | 0.80 | 2 | 25 | 0.82 | 11.7 | 192 |
| 21. | 0.22 | 0.80 | 4 | 25 | 1.10 | 16.9 | 195 |

[1]All experiments were performed using the same batch of UCC P-1700, RV(0.2 g/100 ml, N—methylpyrolidone, 25° C.) = 0.37.
[2]All experiments in methylene chloride solvent either at room-temperature (25° C.) or at reflux (40° C.), except where indicated otherwise.
[3]RV's measured in N—methylpyrolidone at 25° C. (0.2 g/100 ml).
[4]This experiment was performed in 1,2-dichloroethane.
[5]Degradation due to prolonged high-temperature treatment.

Example 22

Forty grams of dried P-1700 was dissolved in 370 ml methylene chloride in a 1,000 ml 3-neck flask fitted with mechanical stirrer, condenser, and nitrogen sparge tube. The solution was purged with nitrogen for one hour and trimethylsilyl chloride (7.57 gm, 0.0697 moles) was added from an addition funnel over 5 minutes and rinsed in with 15 ml of methylene chloride. Chlorosulfonic acid (7.39 gm, 0.0634 mole) was then added dropwise over one hour and rinsed in with 15 ml of methylene chloride. The solution was then stirred at room temperature overnight. The reaction solution was homogeneous throughout this time. A 25% solution (40 gm) of sodium methoxide in methanol was added to the reaction. After an hour the homogeneous solution was added to a large excess of methanol in a blender to coagulate the polymer. The recovered polymer was washed with water and methanol in the blender and dried in a vacuum oven. The polymer reduced viscosity (RV, 0.2% in NMP) was 0.98. Elemental analysis gave 8.92% sulfur and 1.64% sodium (32.3% degree of sulfonation). The product glass transition temperature was 224° C.

The polymer of this example exhibited improved resistance to solvents such as acetone, ethyl acetate, and toluene, compared to polysulfone.

Example 23

The sulfonation reaction was repeated essentially as in Example 22 using 40 gm (P-1700) polysulfone, 6.88 gm (0.0634 mole) trimethylsilyl chloride, and 7.39 gm (0.0634 mole) chlorosulfonic acid in a total of 400 ml methylene chloride containing 1.6 mmole (29 mg) water. A dry ice/acetone condenser was used. A sample taken after 4 hours gave an RV of 0.80. After 22 hours at room temperature, the reaction was treated with base and the polymer recovered, as in Example 22. The product had an RV=1.14, 8.85% sulfur, and 1.50% sodium (30.8% degree of sulfonation).

Comparative Example A

The sulfonation of Example 22 was repeated without trimethylsilyl chloride. Thus, 40 gm of (P-1700) polysulfone in 385 ml methylene chloride was reacted with 7.38 gm (0.0634 mole) chlorosulfonic acid (15 ml solvent rinse). The reaction was heterogeneous, having two distinct phases. After 22 hours, the lower phase was thick and the stirrer was laboring. Sodium methoxide/methanol solution was added which caused partial dissolution of the lower layer. The polymer was recovered as in Example 1, but was extremely difficult to filter because of the fineness of the particles. The recovered polymer had an RV of 0.61 and gave analysis for 9.47% sulfur and 2.39% sodium (nominally 43.9% degree of sulfonation). The polymer glass transition was 264° C. A sample taken after 4 hours had an RV of 0.98.

Compared to Examples 22 and 23, this Examples illustrates that sulfonation with chlorosulfonic acid results in an apparent good degree of sulfonation but can result in a significantly lower molecular weight product. The decrease in molecular weight between 4 and 22 hours (as shown by a decrease in the RV) indicates chain cleavage of the polymer. This Example also illustrates that chlorosulfonic acid alone results in a heterogenous, two-phase system whereas in the presence of trimethylsilyl chloride the reaction is homogeneous.

Comparative Example B

The sulfonation was repeated essentially as in Example 22 using 40 gm of (P-1700) polysulfone in 300 ml methylene chloride and adding a solution of trimethylsilyl chlorosulfonate (11.95 gm, 0.0634 mole, obtained from Fluka AG) in 100 ml methylene chloride over 10 minutes. After stirring at room temperature overnight, the homogeneous reaction medium was treated with sodium methoxide and the polymer recovered as in Example 22. The polymer RV was 1.11 and gave elemental analysis for 8.86% sulfur and 0.439 sodium (31.0% degree of sulfonation).

This Example illustrates that the use of trimethylsilyl chlorosulfonate reagent also results in polymers with good molecular weight and degrees of sulfonation similar to those obtained in Examples 22 and 23. The in situ process of Examples 22 and 23 is, however, less costly.

Example 24

The reaction was repeated essentially as in Example 22, except that the trimethylsilyl chloride (8.25 gm, 0.076 mole) in 25 ml methylene chloride was added to the chlorosulfonic acid (7.39 gm, 0.0634) in 25 ml solvent in an addition funnel. After 2 hours at room temperature this mixture was then added to polysulfone (40 gm) dissolved in 300 ml solvent. After 22 hours, the homogeneous reaction medium was treated with sodium methoxide and the polymer recovered as in Example 22. The polymer RV was 0.96 and elemental analysis gave 8.56% sulfur and 1.07% sodium (24.9% degree of sulfonation).

Premixing the reagents thus also results in a homogeneous reaction and the final molecular weight is comparable to those obtained in Examples 22 and 23. The degree of sulfonation is somewhat less, however. This Example illustrates an alternative mode of practicing the invention, whereas Examples 22 and 23 illustrate a preferred method of carrying out the in situ process.

What is claimed is:

1. A method of making a silyl sulfonate derivative of a poly(aryl ether) resin, comprising reacting
    a linear poly(aryl ether) resin, comprised of repeat units of the formula

—O—E—O—E'— where E is the residuum of a dihydric phenol and E' is the residuum of a benzenoid compound having an electron withdrawing group in at least one of the positions ortho and para to the valence bonds, wherein both of said residua E and E' are bonded to ether oxygens through aromatic carbon atoms
    with an effective amount of a silyl halosulfonate and under reaction conditions sufficient to form said derivative.

2. The method of claim 1, wherein said dihydric phenol residuum is a bisphenol residuum.

3. The method of claim 1, wherein said dihydric phenol is selected from the group consisting of

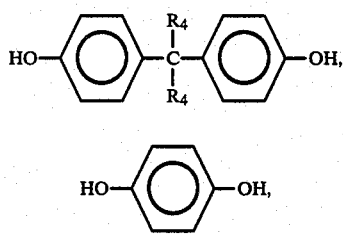

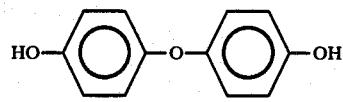

in which the $R_4$ groups represent independently hydrogen, lower alkyl, aryl and the halogen substituted groups thereof.

4. The method of claim 1 wherein said benzenoid compound is selected from the group consisting of

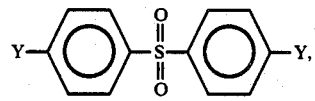

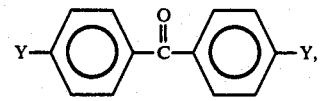

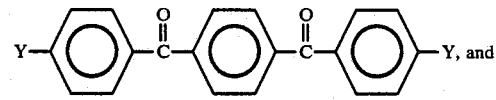

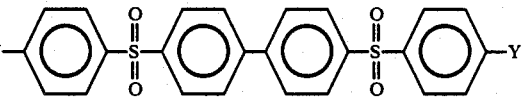

wherein Y is halogen or nitro.

5. The method of claim 4, wherein Y is F or Cl.

6. The method of claim 1, wherein said poly(aryl ether) resin contains repeat units or subunits selected from the group consisting of:

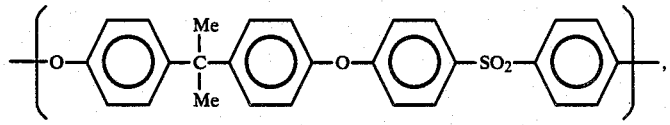

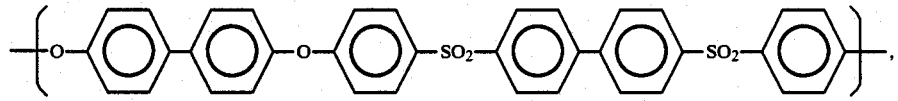

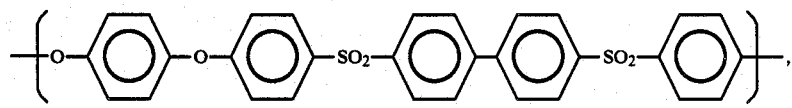

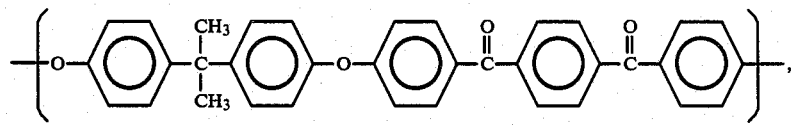

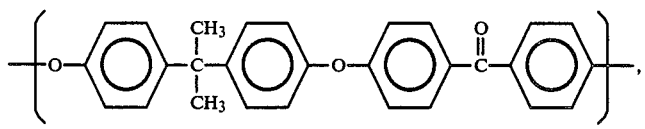

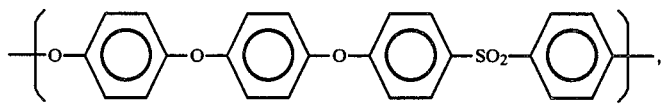

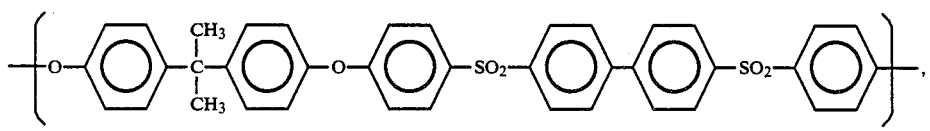

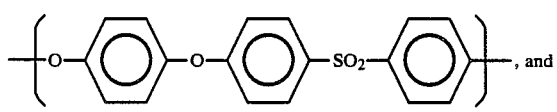

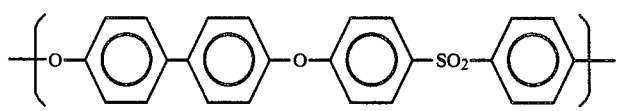

7. The method of claim 6, wherein said poly(aryl ether) resin is a polysulfone.

8. The method of claim 1, wherein said poly(aryl ether) resin is reacted with said silyl halosulfonate at a temperature between about 0° C. and about 35° C.

9. The method of claim 1, wherein said silyl halosulfonate has the structure

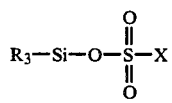

wherein X is halogen selected from Cl, Br, and I and R is an inert organic radical.

10. The method of claim 9, wherein said silyl halosulfonate is trimethylsilyl chlorosulfonate.

11. The method of claim 1, wherein said poly(aryl ether) resin is reacted with said silyl halosulfonate in an inert chloroaliphatic hydrocarbon solvent.

12. The method of claim 1, wherein the amount of said silyl halosulfonate reacted with said poly(aryl ether) resin is between about 0.005 and about 2.0 moles per mole of repeat units —O—E—O—E'—.

13. A silyl sulfonate derivative of a poly(aryl ether) resin produced according to the method of claim 1.

14. A method of sulfonating poly(aryl ether) resins, comprising:

A. making a silyl sulfonate derivative by reacting a linear poly(aryl ether) resin comprised of repeat units of the formula

—O—E—O—E'— where E is the residuum of a dihydric phenol and E' is the residuum of a benzenoid compound having an electron withdrawing group in at least one of the positions ortho and para to the valence bonds, wherein both of said residua E and E' are bonded to ether oxygens through aromatic carbon atoms, with an effective amount of a silyl halosulfonate and under reaction conditions sufficient to form said derivative, followed by B. reacting said derivative with a base, thereby forming a sulfonate salt of said poly(aryl ether) resin.

15. The method of claim 14, wherein said dihydric phenol residuum is a bisphenol residuum.

16. The method of claim 14, wherein said dihydric phenol is selected from the group consisting of

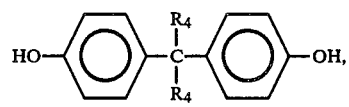

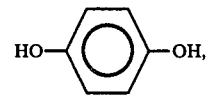

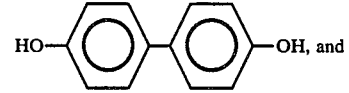

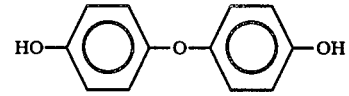

in which the $R_4$ groups represent independently hydrogen, lower alkyl, aryl and the halogen substituted groups thereof.

17. The method of claim 14 wherein said benzenoid compound is selected from the group consisting of

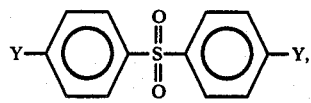

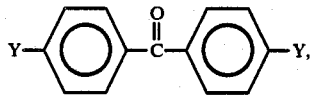

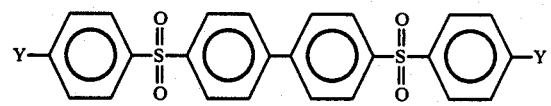

wherein Y is halogen or nitro.

18. The method of claim 17, wherein Y is F or Cl.

19. The method of claim 14, wherein said poly(aryl ether) resin contains repeat units or subunits selected from the group consisting of:

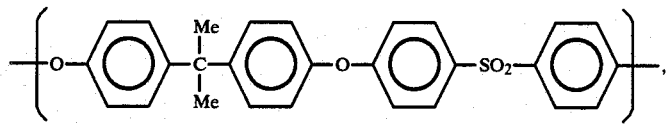

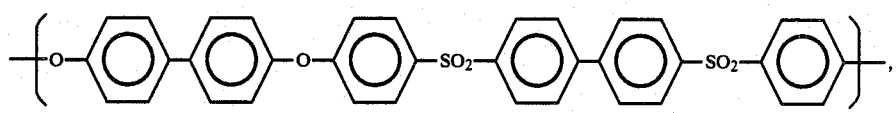

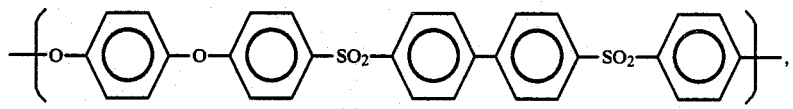

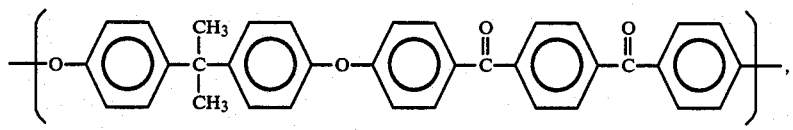

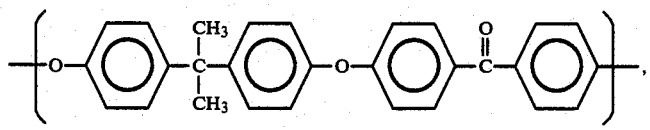

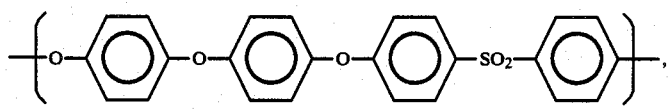

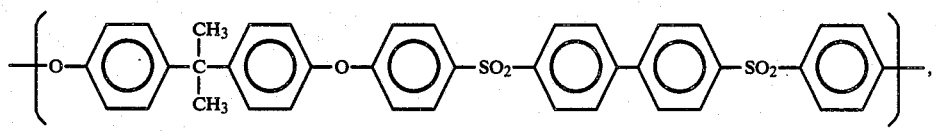

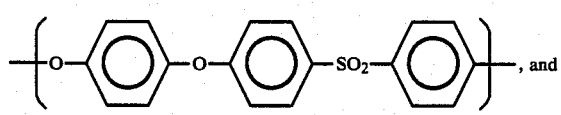, and

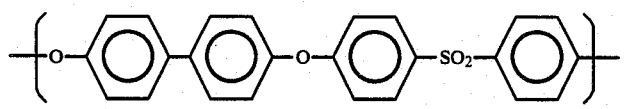

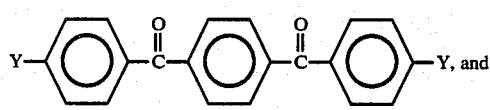, and

20. The method of claim 19, wherein said poly(aryl ether) resin is a polysulfone.

21. The method of claim 14, wherein said poly(aryl ether) resin is reacted with said silyl halosulfonate at a temperature between about 0° C. and about 35° C.

22. The method of claim 14, wherein the poly(aryl ether) resin is reacted with said silyl halosulfonate in an inert chloroaliphatic hydrocarbon solvent.

23. The method of claim 14, wherein said silyl halosulfonate has the structure

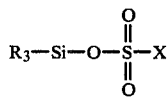

wherein X is selected from Cl, Br, and I and R is an inert organic radical.

24. The method of claim 23, wherein said silyl halosulfonate is trimethylsilyl chlorosulfate.

25. The method of claim 14, wherein the amount of said silyl halosulfonate reacted with said poly(aryl ether) resin is between about 0.005 and about 2 moles per mole of repeat units —O—E—O—E'—.

26. The method of claim 14, wherein said base is an alkali or alkaline earth metal hydroxide or an alkali metal alkoxide.

27. The method of claim 26 wherein said alkali metal is sodium, potassium or lithium.

28. The method of claim 26 wherein said alkali metal hydroxide contains 1–15 carbon atoms.

29. The method of claim 28 wherein said alkali metal alkoxide contains 1–3 carbon-atoms.

30. The method of claim 29 wherein said alkali metal alkoxide is an alkali metal methoxide or ethoxide.

31. The method of claim 14, wherein said poly(aryl ether) resin sulfonate salt is exposed to acid, thereby converting said resin sulfonate salt to a resin sulfonic acid.

32. A method of making a silyl sulfonate derivative of a poly(aryl ether) resin, comprising reacting a linear poly(aryl ether) resin, comprised of repeat units of the formula

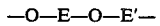

where E is the residuum of a dihydric phenol and E' is the residuum of a benzenoid compound having an electron withdrawing group in at least one of the positions ortho and para to the valence bonds, wherein both of said residua E and E' are bonded to ether oxygens through aromatic carbon atoms with a combination of a silyl halide and a halosulfonic acid, each in an effective amount and under reaction conditions sufficient to form said derivative.

33. The method of claim 32, wherein said dihydric phenol residuum is a bisphenol residuum.

34. The method of claim 32, wherein said dihydric phenol is selected from the group consisting of

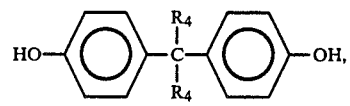

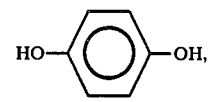

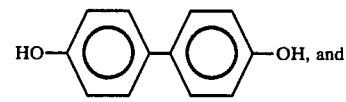

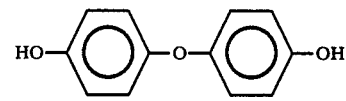

in which the $R_4$ groups represent independently hydrogen, lower alkyl, aryl and the halogen substituted groups thereof.

35. The method of claim 32 wherein said benzenoid compound is selected from the group consisting of

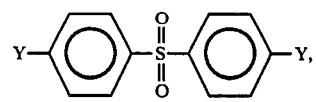

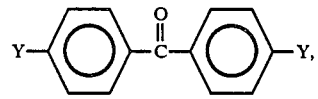

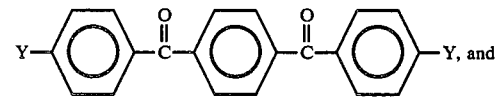

wherein Y is halogen or nitro.

36. The method of claim 35, wherein Y is F or Cl.

37. The method of claim 32, wherein said poly(aryl ether) resin contains repeat units or subunits selected from the group consisting of:

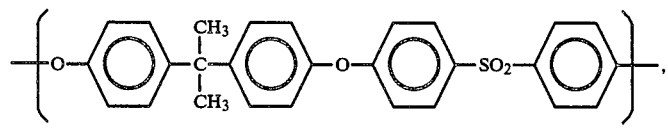

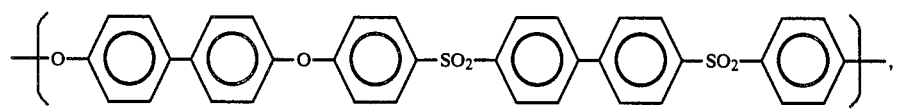

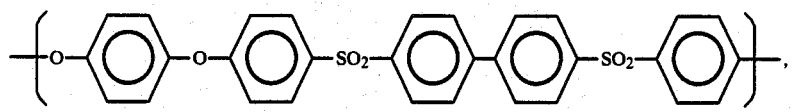

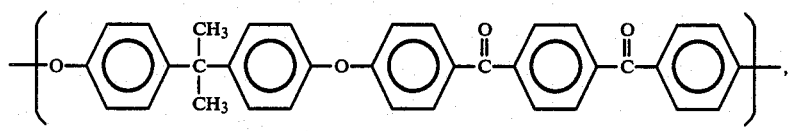

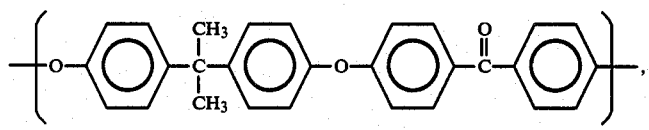

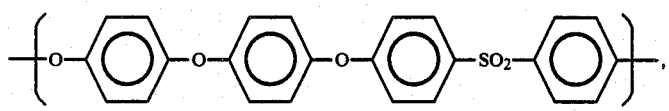

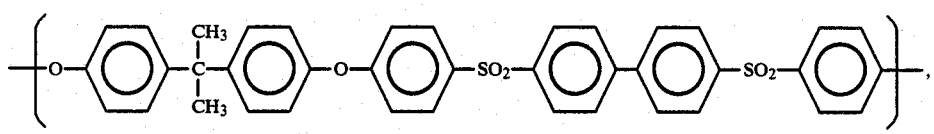

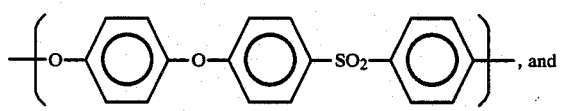, and

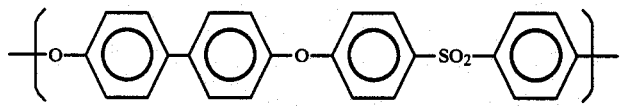

38. The method of claim 37, wherein said poly(aryl ether) resin is a polysulfone.

39. The method of claim 32, wherein said poly(aryl ether) resin is reacted with said combination at a temperature between about 0° C. and about 35° C.

40. The method of claim 38, wherein said silyl halide has the structure $$R_3-Si-X$$

wherein X is halogen selected from Cl, Br, and I and the R groups independently are inert organic radicals.

41. The method of claim 40, wherein said silyl halide is trimethylsilyl chloride.

42. The method of claim 32, wherein said halosulfonic acid is chlorosulfonic acid.

43. The method of claim 32, wherein said poly(aryl ether) resin is reacted with said combination in an inert chloroaliphatic hydrocarbon solvent.

44. The method of claim 32, wherein an amount of said halosulfonic acid between 0.005 and about 2 moles per mole of repeat units, —O—E—O—E'— is reacted with said poly(aryl ether) resin.

45. The method of claim 44, wherein an amount of said silyl halide between about 0.5 and about 2 moles per mole of said halosulfonic acid is reacted with said poly(aryl ether) resin.

46. A silyl sulfonate derivative of a poly(aryl ether) resin produced according to the method of claim 32.

47. A method of sulfonating poly(aryl ether) resins, comprising:

A. making a silyl sulfonate derivative by reacting a linear poly(aryl ether) resin comprised of repeat units of the formula

—O—E—O—E'— wherein E is the residuum of a dihydric phenol and E' is the residuum of a benzenoid compound having an electron with drawing group in at least one of the positions ortho and para to the valence bonds, wherein both of said residua E and E' are bonded to ether oxygens through aromatic carbon atoms, with a combination of a silyl halide and a halosulfonic acid each in an effective amount and under reaction conditions sufficient to form said derivative, followed by B. reacting said derivative with a base, thereby forming a sulfonate salt of said poly(aryl ether) resin.

48. The method of claim 47, wherein said dihydric phenol residuum is a bisphenol residuum.

49. The method of claim 47, wherein said dihydric phenol is selected from the group consisting of

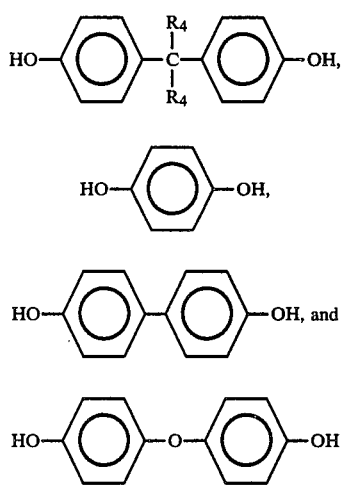

(a)

(b)

(c)

(d)

in which R4 groups represent independently hydrogen, lower alkyl, aryl and the halogen substituted groups thereof.

50. The method of claim 47 wherein said benzenoid compound is selected from the group consisting of

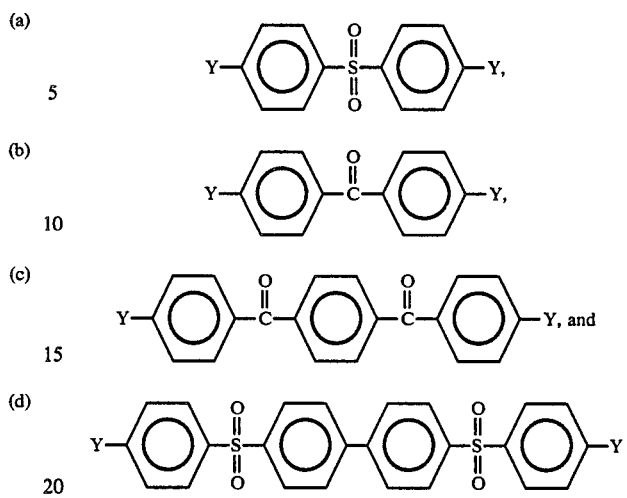

wherein Y is halogen or nitro.

51. The method of claim 50, wherein Y is F or Cl.

52. The method of claim 47, wherein said poly(aryl ether) resin contains repeat units or subunits selected from the group consisting of:

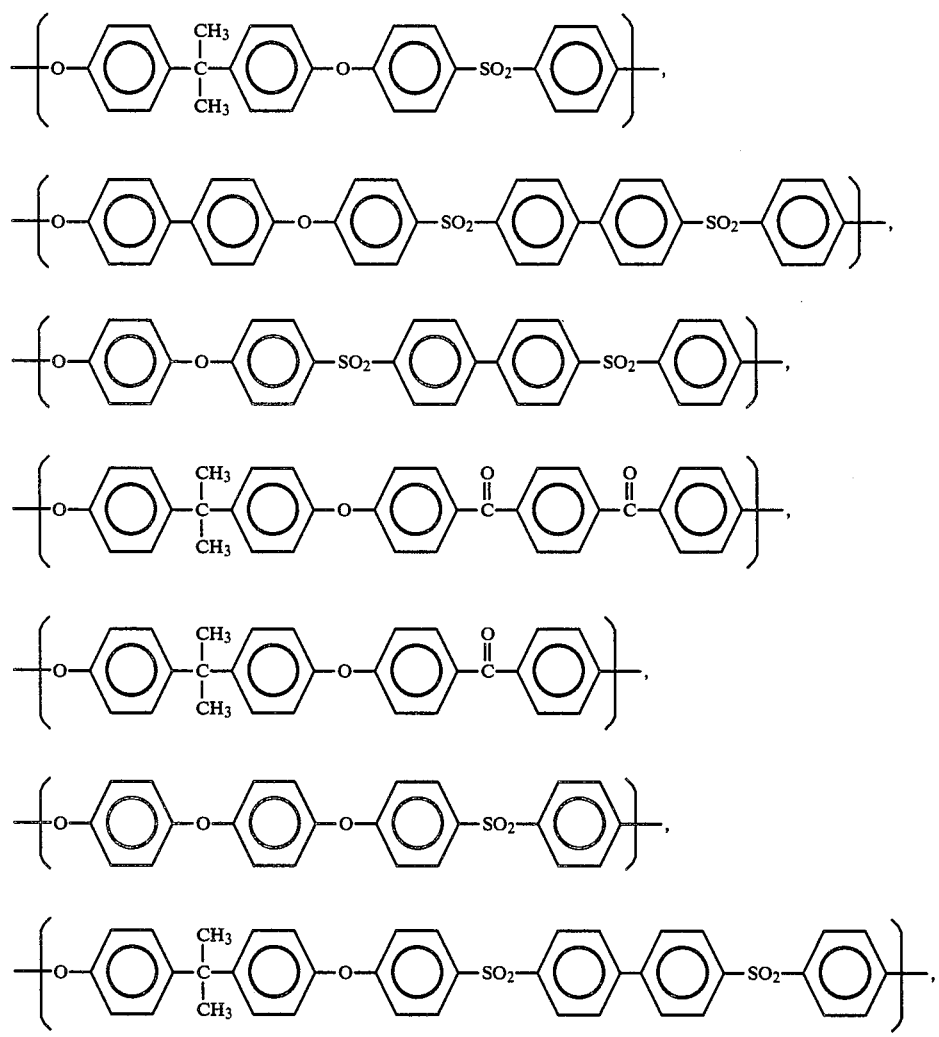

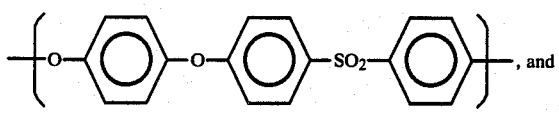, and

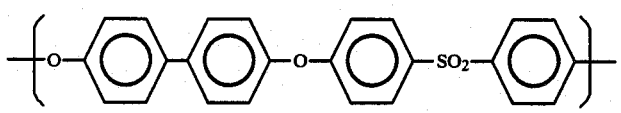

53. The method of claim 52, wherein said poly(aryl ether) resin is a polysulfone.

54. The method of claim 47, wherein said poly(aryl ether) resin is reacted with said combination at a temperature between about 0° and about 35° C.

55. The method of claim 47, wherein the poly(aryl ether) resin is reacted with said combination in an inert chloroaliphatic hydrocarbon solvent.

56. The method of claim 47, wherein said silyl halide has the structure $$R_3-Si-X$$

wherein X is halogen selected from Cl, Br, and I and the R groups independently are inert organic radicals.

57. The method of claim 56, wherein said silyl halide is trimethylsilyl chloride.

58. The method of claim 47, wherein said halosulfonic acid is chlorosulfonic acid.

59. The method of claim 47, wherein the amount of said halosulfonic acid reacted with said poly(aryl ether) resin is between about 0.005 and about 2.0 moles per mole of repeat units —O—E—O—E'—.

60. The method of claim 47, wherein the amount of said silyl halide reacted with said poly(aryl ether) resin is between about 0.5 and about 2 moles per mole of said halosulfonic acid.

61. The method of claim 47, wherein said base is an alkali or alkaline earth metal hydroxide or an alkali metal alkoxide.

62. The method of claim 61 wherein said alkali metal is sodium, potassium or lithium.

63. The method of claim 61 wherein said alkali metal alkoxide contains 1-15 carbon atoms.

64. The method of claim 63 wherein said alkali metal alkoxide contains 1-3 carbon-atoms.

65. The method of claim 64 wherein said alkali metal alkoxide is an alkali metal methoxide or ethoxide.

66. The method of claim 47, wherein said poly(aryl ether) resin sulfonate salt is exposed to acid, thereby converting said resin sulfonate salt to a resin sulfonic acid.

67. The method of claim 14, wherein the silyl halosulfonate is derived from the introduction of a silyl halide and a halosulfonic acid, as recited in claim 47.

* * * * *

UNITED STATES PATENT OFFICE
CERTIFICATE OF CORRECTION

Patent No. 4,625,000                    Dated November 25, 1986

Inventor(s) HERBERT S. CHAO AND DONALD R. KELSEY

It is certified that error appears in the above-identified patent and that said Letters Patent are hereby corrected as shown below:

In Claim 28 line 2, "hydroxide" should read ---alkoxide---.

Signed and Sealed this

Twenty-eighth Day of April, 1987

Attest:

DONALD J. QUIGG

Attesting Officer        Commissioner of Patents and Trademarks